Figure 1:
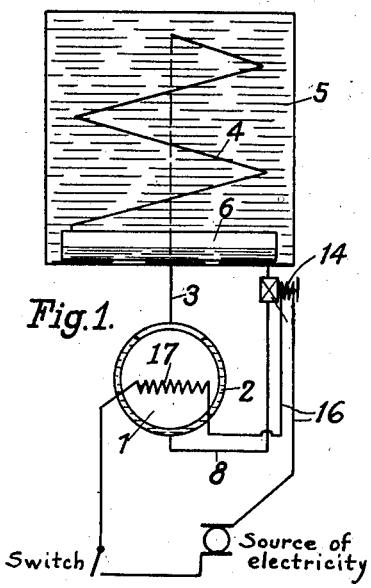

Sept. 12, 1933.   E. KINDERMANN   1,926,286
REFRIGERATING PLANT
Filed July 9, 1929

Inventor:
ERICH KINDERMANN
BY
Attorneys.

Patented Sept. 12, 1933

1,926,286

UNITED STATES PATENT OFFICE 1,926,286

REFRIGERATING PLANT

Erich Kindermann, Berlin-Reinickendorf-West, Germany, assignor to Deutsche Gasglühlicht-Auer-Gesellschaft m. b. H., Berlin, Germany, a corporation of Germany Application July 9, 1929, Serial No. 376,951, and in Germany July 24, 1928

6 Claims. (Cl. 62—118)

An appropriate cooling of the generator absorber in periodically working absorption refrigerating plants is very difficult since during the boiling or generating period the cooling must be interrupted, while the quantity of heat to be removed during the cooling period fluctuates widely and in addition the temperature of the absorber must be kept as low as possible. The cooling by means of flowing water is best adapted for that purpose owing to its low temperature which is below that of the atmosphere and owing to the high capability of absorbing heat within definite ranges of temperature capable of being controlled by the quantity of fluid passing through. But water from a main is not available everywhere and it will require complex automatic devices for reversing, which will give cause to frequent trouble. For that reason it has already been proposed to cool the absorber by air, by encasing it for example in a flue and closing the exhaust pipe during the heating period. On account of the low specific heat of the air and its bad heat conducting effect the action of such cooling is very poor, that is to say the cooling takes place too slowly, the difference in temperature between the air absorbing heat and the wall of the container radiating the heat being too great, so that no economical operation is possible. The cooling action, however, may be increased by passing the air past the heat exchanging surfaces by means of fans, but by the introduction of such means fresh sources of trouble will be created. Thus the drawback of the small adaptability of such direct cooling by air in respect of the removal of widely varying quantities of heat would remain.

The object of the present invention is an indirect cooling by air which is almost equal in effect to the cooling by water drawn from the main. The method consists in that a second refrigerant will be introduced in the process of the absorption machine, which uses the generator absorber of the absorption refrigerating plant as evaporator, being condensed in a special condenser, where the heat of condensation is absorbed by the air. The condenser and evaporator of the refrigerating plant are in open communication, so that the pressure of evaporation and condensation is equal, which also accounts for the process being carried through in a cycle automatically without the expenditure of work. Further the process has been improved in that the condenser is placed for instance in a water tank of large heat absorbing capacity, by which is attained a high adaptability to the removal of widely varying quantities of heat although the dimensions of the outer condensing surfaces are rather small. The admission of the refrigerant is interrupted during the generating period to the cooling device of the generator absorber.

A mode of execution of the invention is shown in the drawing by way of example.

Figure 2:
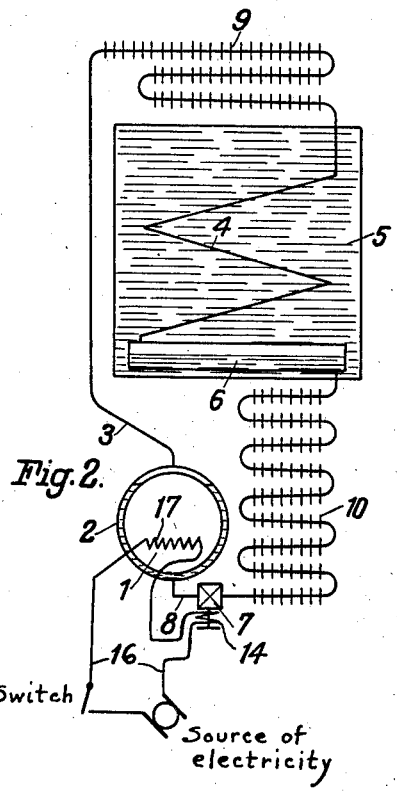
Figure 3:
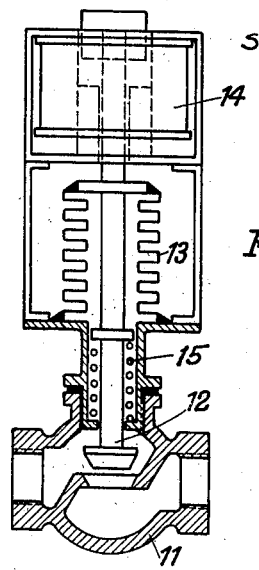

Figure 1 is a diagrammatic view of the arrangement, and Figure 2 is a diagrammatic view of a modification. Figure 3 shows in detail a valve controlling device.

In the example shown in Figure 1 the generator absorber of the refrigerating machine is designated as 1, 2 to 8 being the cooling device, 2 denoting the evaporator, 3 the steam pipe to the condenser, 4 the condenser coil, 5 the water tank, 6 the receptacle for supplying the refrigerant and 7 a check valve in the admission pipe 8 leading to the evaporator.

At the beginning of the heating period the admission of fluid to the evaporator 2 is interrupted by valve 7, so that the generator will no longer be cooled. During such heating period, any liquid refrigerant which at the beginning of such period was contained in the jacket constituting the evaporator 2, will be converted into vapors which through the pipe 3 pass to the condenser 4, the condensate collecting in the receptacle 6. Thus during the heating period the jacket or evaporator 2 will contain no liquid, but only hot vapors which are a poor conductor of heat, and thus heat-radiation from the generator-absorber 1 to the surrounding air will be minimized during the heating period, which result is desirable from the point of view of thermic efficiency. After the termination of the heating period the valve 7 is opened so that the liquid refrigerant from receptacle 6 can enter again into the evaporator 2 where it will be evaporated by absorbing the heat of evaporation from the generator-absorber. The vapours flow through the pipe 3 to the condenser where they will condense while the heat of condensation will be absorbed by the surrounding body of water in the tank 5. The condensate flows into the receptacle 6 and is returned to the inlet pipe 8 through the valve 7, thus establishing a flow in a closed circuit. During this cooling period, the valve 7 being open as stated, the jacket constituting the evaporator 2 will be filled with liquid, at least in part as indicated in Figs. 1 and 2, and since such liquid is a much better conductor of heat than the vapors which filled the evaporator during the heating period, the radiation of heat from the generator-absorber 1 to the surrounding air, through the exposed outer surface of the evaporator 2, will be promoted during such cooling period, and this again is a desirable result from the point of view of thermic efficiency. If for instance a liquid is employed which will boil at 30 degrees centigrade and about 1 atmosphere of pressure, it is obvious, that up to the cooling down of the absorber from about 130 degrees to about 50 degrees centigrade the cooling of the absorber is effected more rapidly owing to the enormous withdrawal of heat during the evaporation, than by means of water cooling. There is the drawback, however, that the heat thus withdrawn from the absorber will have raised the temperature of the water in the condenser, so that this temperature will be about 10 degrees above that of the air when using an amount of water such as permitted by practical considerations. As the heat from the water reservoir is transferred only slowly to the surrounding air, the said temperature is the lower limit of the cooling action. Although this limit lies only about 10 degrees below the temperature obtainable by air-cooling and about 10 degrees above that obtainable by water-cooling, the process must be considered just as efficient as water cooling, since the rapid cooling from the final generator temperature to the economical absorber temperature is the criterion for an efficient cooling effect.

In order to effect a further reduction of the lower cooling limit various expedients could be applied, for instance a direct air-cooled auxiliary condenser could be arranged for removing the superheat, as well as a likewise direct air-cooled auxiliary cooler for the additional cooling of the condensate collected. This arrangement is shown in Figure 2, where 9 represents the auxiliary cooling device for removing the superheat before condensation and 10 the auxiliary cooling device for cooling after condensation. An improvement could also be obtained by greatly increasing the surface of the condenser casing by means of ribs or corrugated walls, in order to be able at the termination of the process, when the stronger concentration of the solution in the generator absorber will require lower temperatures, to bring the temperature below the said lower cooling limit.

In both constructions illustrated, the evaporator 2 is formed as a jacket surrounding the generator absorber 1; this arrangement is of high efficiency.

The control of the valve 7 is suitably adapted to the control of the source of heat in each particular case. For instance, Figure 3 shows a control of the valve 7 operated electrically. Here 11 is the valve casing, 12 the valve spindle with the valve body or cone, 13 a diaphragm for sealing the chamber around the spindle, against the atmosphere and 14 is a magnet for actuaing the spindle of said valve against the action of a spring 15. The coil of the magnet is connected with the heating circuit 16 containing the heater coil 17 and requires no special control.

I claim:

1. An apparatus of the class described, comprising a generator absorber, an evaporator associated with said generator absorber, said evaporator being filled with a heat-transferring liquid during the heating period when said generator absorber acts as an absorber, while during the cooling period, when such generator absorber acts as a generator, the evaporator is filled with vapors of said liquid to insulate the generator and minimize the radiation of heat therefrom a liquid-containing tank, a condenser coil in said tank to be cooled by the liquid therein, an air-cooled coil the ends of which are connected with the upper portions of the evaporator and of the liquid-cooled coil respectively, and another air-cooled coil the ends of which are connected with the lower portions of the evaporator and of the liquid-cooled coil respectively.

2. An apparatus of the class described, comprising a generator absorber, an evaporator associated with said generator absorber, said evaporator being filled with a heat-transferring liquid during the heating period when said generator absorber acts as an absorber, while during the cooling period, when such generator absorber acts as a generator, the evaporator is filled with vapors of said liquid to insulate the generator and minimize the radiation of heat therefrom a liquid-containing tank, a condenser coil in said tank to be cooled by the liquid therein, a conduit connecting the upper portions of the evaporator and of the liquid-cooled coil, and an air-cooled coil the ends of which are connected with the lower portions of the evaporator and of the liquid-cooled coil respectively.

3. An apparatus of the class described, comprising a generator absorber, an evaporator associated with said generator absorber, said evaporator being filled with a heat-transferring liquid during the heating period when said generator absorber acts as an absorber, while during the cooling period, when such generator absorber acts as a generator, the evaporator is filled with vapors of said liquid to insulate the generator and minimize the radiation of heat therefrom a liquid-containing tank, a condenser coil in said tank to be cooled by the liquid therein, a conduit connecting the upper portions of the evaporator and of the liquid-cooled coil, a return conduit connecting the lower portions of the evaporator and of the liquid-cooled coil, a valve controlling said return conduit, an electrically-controlled heater for the generator absorber, an electrical control device for said valve, and an electric circuit for said heater and said control device, to cause the valve to be closed automatically when the heater is thrown into operation.

4. An apparatus of the class described, comprising a generator absorber, an evaporator associated with said generator absorber, said evaporator being filled with a heat-transferring liquid during the heating period when said generator absorber acts as an absorber, while during the cooling period, when such generator absorber acts as a generator, the evaporator is filled with vapors of said liquid to insulate the generator and minimize the radiation of heat therefrom a liquid-containing tank, a condenser coil in said tank to be cooled by the liquid therein, a conduit connecting the upper portions of the evaporator and of the liquid-cooled coil, a return conduit connecting the lower portions of the evaporator and of the liquid-coled coil, a valve controlling said return conduit, means tending to open said valve, an electrical control device for closing said valve, an electrically-controlled heater for the generator absorber, and an electric circuit for said heater and said control device, to cause the valve to be closed automatically when the heater is thrown into operation, and to be opened automatically when the heater is thrown out of operation.

5. An apparatus of the class described, comprising a generator absorber, an evaporator jacket surrounding said generator absorber, the outer surface of said jacket being exposed to a cooling medium, a liquid-containing tank, a condenser coil in said tank, a connection from the upper portion of said jacket to the upper portion of said condenser coil, a valved connection from the lower portion of said coil to the lower portion of said jacket, said two connections together with said coil and said evaporator jacket forming a closed circuit, and a vaporizable liquid in said circuit, said jacket containing such liquid during the cooling period when the valved connection is open and the generator absorber acts as an absorber, whereby such liquid will promote the transfer of heat from the absorber to the cooling medium which is in contact with the outer surface of the jacket, while during the heating period when the valved connection is closed and the generator absorber acts as a generator, the jacket will be filled with vapors of said liquid to minimize transfer of heat from the generator to the cooling medium which is in contact with the outer surface of the jacket.

6. An apparatus of the class described, comprising a generator absorber, an evaporator jacket surrounding said generator absorber, the outer surface of said jacket being exposed to the surrounding air, a liquid-containing tank, a condenser coil in said tank, a connection from the upper portion of said jacket to the upper portion of said condenser coil, a valved connection from the lower portion of said coil to the lower portion of said jacket, said two connections together with said coil and said evaporator jacket forming a closed circuit, and a vaporizable liquid in said circuit, said jacket containing such liquid during the cooling period when the valved connection is open and the generator absorber acts as an absorber, whereby such liquid will promote the transfer of heat from the absorber to the surrounding air which is in contact with the outer surface of the jacket, while during the heating period when the valved connection is closed and the generator absorber acts as a generator, the jacket will be filled with vapors of said liquid to minimize transfer of heat from the generator to the surrounding air which is in contact with the outer surface of the jacket.

ERICH KINDERMANN.